Sept. 25, 1951 M. V. TRACY 2,569,354
STRAIGHT-LINE-MOTION SWINGING SAW SUPPORT
Filed Nov. 22, 1946 4 Sheets-Sheet 1

INVENTOR
*Mearl V. Tracy*
BY
ATTORNEYS

Sept. 25, 1951 M. V. TRACY 2,569,354
STRAIGHT-LINE-MOTION SWINGING SAW SUPPORT
Filed Nov. 22, 1946 4 Sheets-Sheet 4

INVENTOR.
Mearl V. Tracy
BY
ATTYS

Patented Sept. 25, 1951

2,569,354

UNITED STATES PATENT OFFICE 2,569,354

STRAIGHT-LINE-MOTION SWINGING SAW SUPPORT

Mearl V. Tracy, Pasadena, Calif.

Application November 22, 1946, Serial No. 711,789

3 Claims. (Cl. 143—46)

This invention is directed to, and it is an object to provide, a novel structure adapted to support an initially portable type, electric hand saw for selective guided movement relative to a work supporting table whereby to convert such a hand saw into a radial type power saw for rapid and accurate cutting operations.

Another object of the invention is to provide a saw support, as above, which is arranged so that the saw is movable transversely of the work in a path parallel to a horizontal plane, as is desirable for cross cutting; the support including adjustable means whereby the angle and depth of cut of the saw may be readily and accurately predetermined.

A further object of the invention is to provide a saw support of the type described which mounts the saw for guided movement to cross cut, or stationary for ripping, selectively; there being a lock-up device provided for rigidly securing the saw, in correct position, for a ripping operation wherein the work moves relative to the stationary saw.

An additional object of the invention is to provide a support, as in the preceding paragraphs, wherein the saw is effectively mounted for use, selectively, to cut-off, miter, bevel cross-cut, compound miter, rip, or bevel rip. With the device which is the subject of this invention, sawing operations can be accomplished, by an electric hand saw, in a manner comparable to large and expensive radial saws. For example, all roof cuts can be made rapidly, accurately, and uniformly.

It is also an object of the invention to provide a saw support which includes a novel, multiple arm assembly for mounting of the saw; such arm assembly when retracted or folded occupying a relatively small space.

A further object of the invention is to produce a practical saw support which will be exceedingly effective for the purpose for which it is designed.

These objects are accomplished by means of such structure and relative arrangement of parts as will fully appear by a perusual of the following specification and claims.

Figure 1:
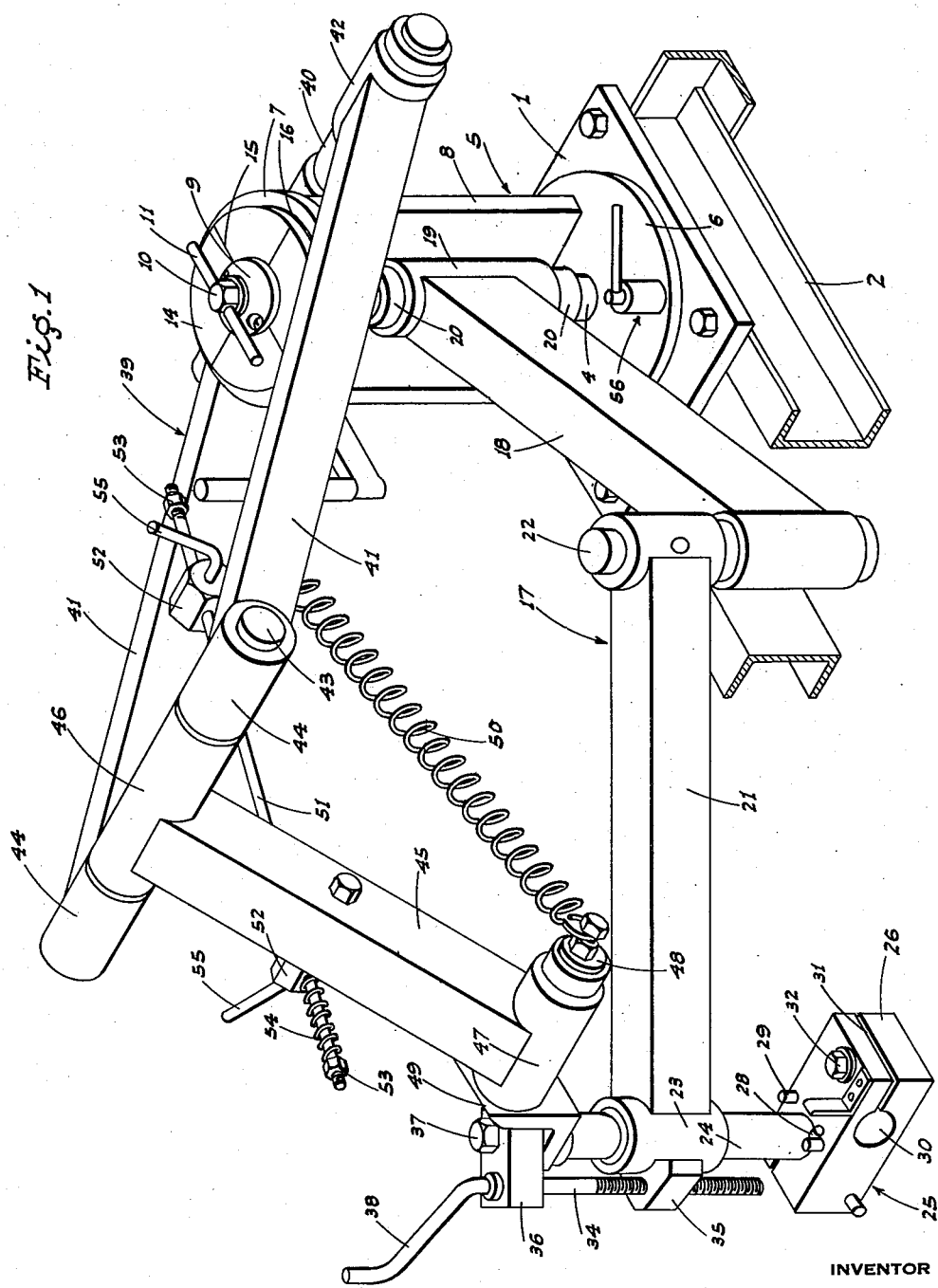
Fig. 1 is a perspective view of the saw support.

Referring now more particularly to the characters of reference on the drawings, the saw support comprises a horizontal base 1, adapted to be mounted centrally, and at the rear, on a rectangular, horizontal frame 2, which frame is adapted to be fitted with a wooden work table 3 ahead of the base plate 1.

A heavy-duty, non-rotatable spindle 4 is fixed centrally on the base plate 1 and upstands in rigid relation therefrom.

A column unit, indicated generally at 5, is supported by the base plate 1, and is mounted in connection with the spindle 4 in surrounding rotatably adjustable relation; such column unit being constructed as follows:

A bottom disc 6 is seated on the base plate 1 and journaled for rotation about the lower end portion of the fixed spindle 4, while a top disc 7 is similarly journaled for rotation about the upper end portion of said spindle; the discs 6 and 7 being connected by a vertical post 8 which extends therebetween. In the present embodiment the post 8 is an angle iron, as shown.

Figure 3:
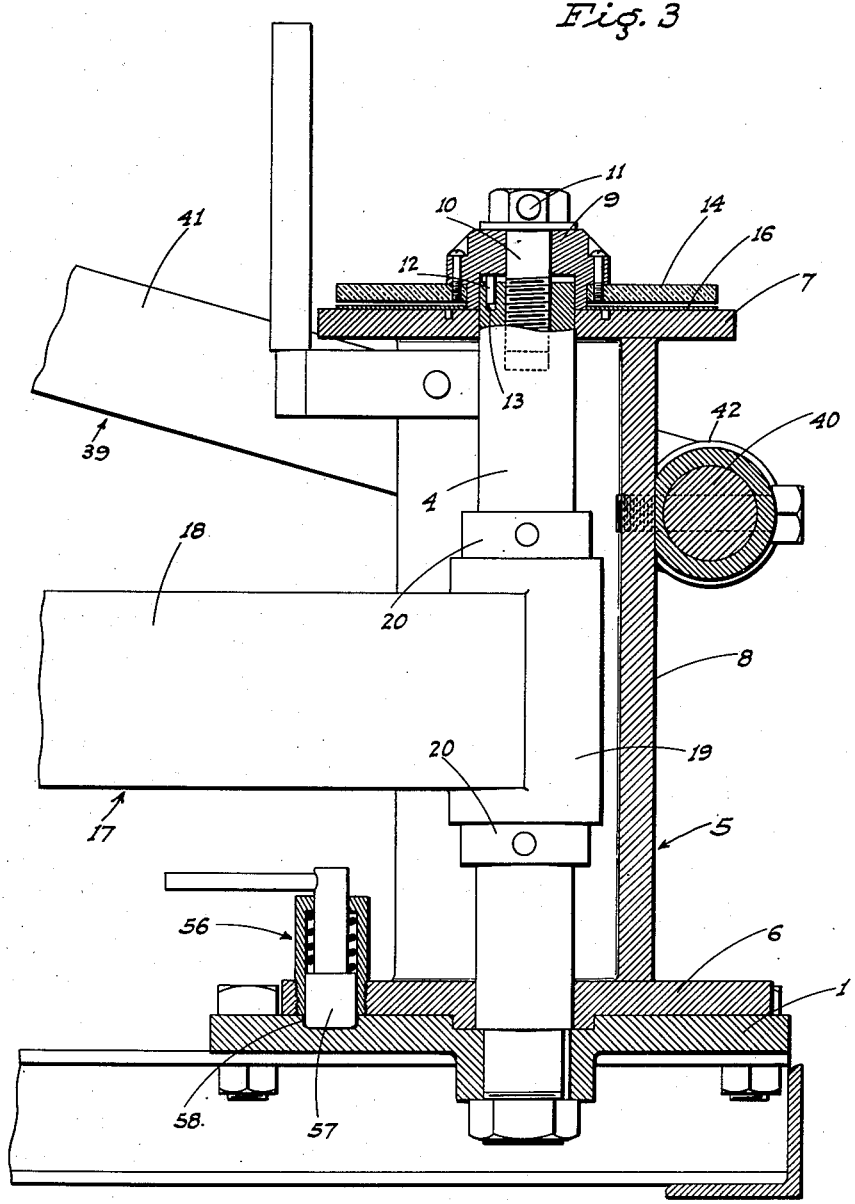
Fig. 3 is an enlarged fragmentary sectional elevation of the column unit and related parts.
Figure 4:
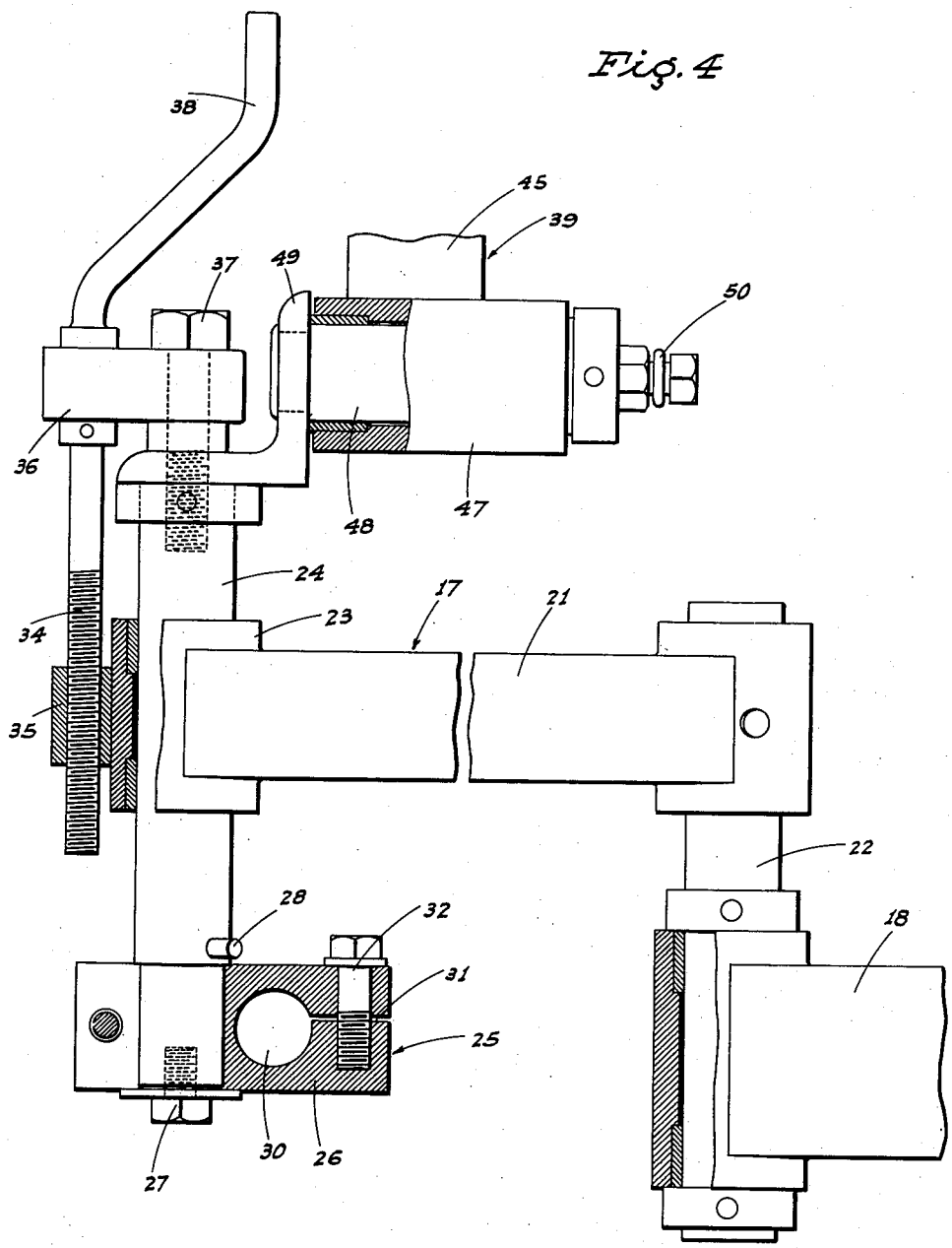
Fig. 4 is an enlarged fragmentary elevation, partly in section, of the outer end assembly of the saw support, including the vertically adjustable, spindle mounted attachment head unit.

The column unit 5 is normally maintained, against rotation, in any selected position of rotative adjustment about the spindle 4 by means of a clamping cap 9 engaged on the upper end of the spindle 4 and bearing against the top disc 7; there being a locking screw 10 extending through the cap 9 and threading into the spindle 4. See Fig. 3. The head of the locking screw 10 bears against the top of the cap 9, and when said screw is tightened, the column unit 5 is engaged with sufficient friction against the base plate 1 to prevent rotation of said column. A cross handle 11 through the head of the locking screw 10 facilitates tightening or loosening of such screw.

A pin 12 projects from the clamping cap 9 into a matching bore 13 in the upper end of the spindle 4 parallel to the axis of the latter; such pin preventing relative rotation between the cap 9 and said spindle. The reason for the above arrangement resides in the fact that the clamping cap 9 carries a transparent annular dial 14 having radial hair lines 15 (Fig. 1) thereon adapted to read on a circular, angle scale disc 16 fixed on the top disc 7 directly under the dial 14. This assembly of the dial 14, and angle scale disc 16, makes possible the setting of the column unit accurately in any pre-selected position of rotative adjustment. The advantage of this will hereinafter appear.

An articulated supporting arm assembly, indicated generally at 17, is mounted in connection with the spindle 4 and projects forwardly therefrom; said supporting arm assembly 17 comprising the following:

An inner supporting arm 18 is fixed in connection with, and projects forwardly from, a vertical-axis bearing sleeve 19 turnable about the spindle 4 intermediate its ends, and said bearing sleeve 19 is carried between collars 20 on said spindle.

An outer supporting arm 21 projects forwardly and outwardly beyond the outer end of said inner supporting arm 18; adjacent ends of the arms 18 and 21 being secured together by a vertical pivot arrangement, including a pivot pin 22. As shown, the arms 18 and 21 are disposed in angular relationship to each other in a horizontal plane, and in operation of the saw-support never reach dead-center.

At its outer end the supporting arm 21 is fitted with a vertical-axis bearing sleeve 23, through which a spindle 24 engages in vertically adjustable relation.

At its lower end the spindle 24 carries an attachment head unit, indicated generally at 25; said attachment head unit being in the form of a block 26 through which a reduced diameter end portion of the spindle 24 projects. A locking bolt 27 secures the block 26 to the spindle 4 in normally rigid but rotatably adjustable relation. A radial pin 28 projects outwardly from the spindle 24 directly above the block 26, and spaced stops 29 limit the extent to which the block 26 may be rotatably adjusted in a horizontal plane.

Figure 2:
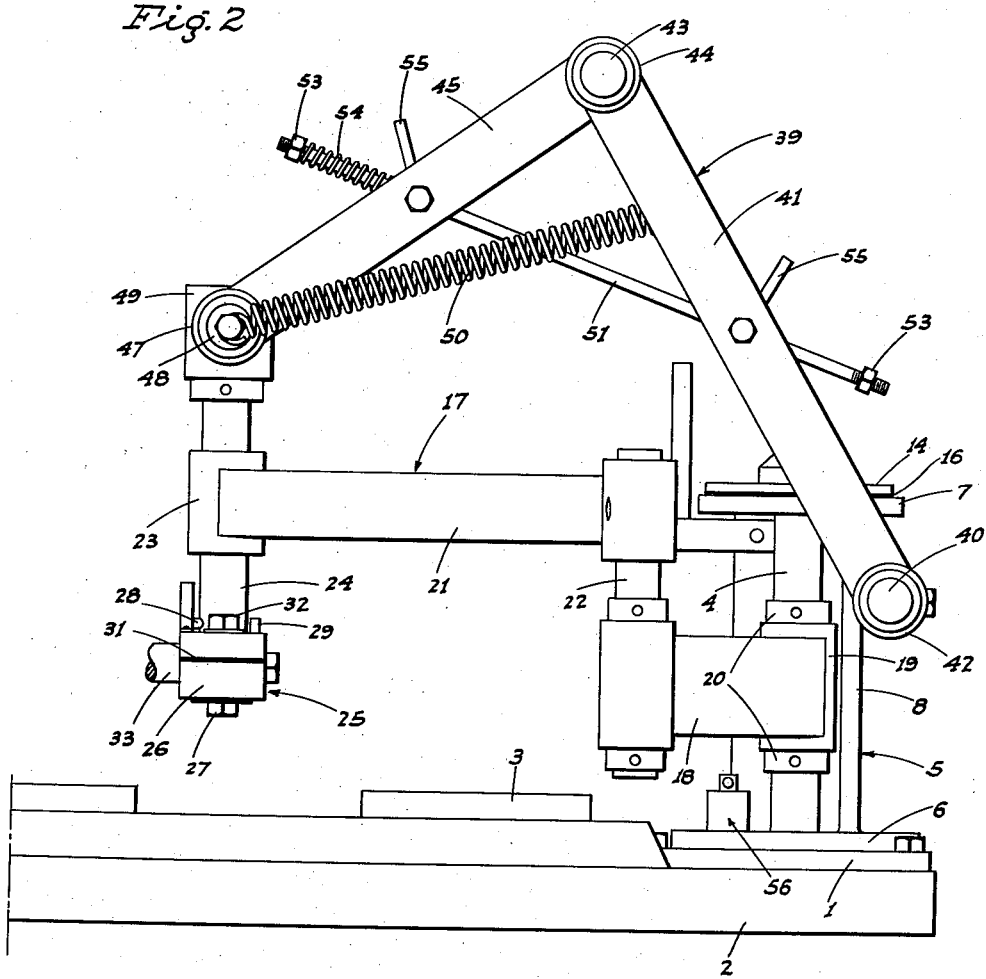
Fig. 2 is a side elevation of the saw support.

In offset relation to the spindle 24, the block 26 includes a transverse bore 30, and said block is split, as at 31, in communication with such bore; the split portion of the block being connected by a clamping bolt 32. The bore 30 is adapted for the reception, in rotatably adjustable relation, of a stub shaft 33 (Fig. 2) of a connector or adapter (not otherwise shown) which is adapted to secure an electric hand saw to the atachment head unit 25. It will be seen that by rotatable adjustment of the stub shaft 33, the blade of the electric hand saw may be angled for bevel cuts.

The spindle 24 is vertically adjustably mounted as follows:

An actuating screw 34 is disposed vertically in front of the bearing sleeve 23, and is threaded through a nut 35 fixed on said sleeve. Intermediate its ends the actuating screw 34 is rotatably but axially immovably engaged through a block 36 which extends inwardly from the screw 34 in overhanging relation to the upper end of the spindle 24, to which it is rigidly connected by a cap screw 37. Above the block 36 the screw 34 is formed as a crank 38. Upon rotation, manually, of the crank 38 in one direction or the other, the screw 34 either lowers or raises relative to the nut 35, accomplishing a corresponding movement of the spindle 24, and adjustment of the depth of cut of the saw mounted in connection with the attachment head unit 25.

The articulated supporting arm assembly 17 is the means employed to maintain the attachment head unit 26, and the supported electric hand saw, for movement in a horizontal plane, transversely relative to the work table 3. However, the articulated supporting arm assembly 17 does not function to maintain any predetermined line of cut; i. e. a straight line of cut without lateral deflection, and to accomplish this a separate articulated guiding arm assembly is provided, as indicated generally at 39. The articulated supporting arm assembly 17 works on vertical axes, as described, whereas the guiding arm assembly 39, which is disposed above the assembly 17, works on horizontal axes, and is constructed as follows:

Intermediate its ends the post 8 is provided with a fixed, horizontal cross shaft 40 projecting laterally on opposite sides of the column unit 5. A pair of parallel, forwardly and upwardly inclined arms 41 are fitted, at their rear or inner ends, with bearing sleeves 42 turnably mounted on opposite end portions of the cross shaft 40, but are maintained against axial shifting therealong. A cross shaft 43 is journaled in connection with, and extends between, bearing sleeves 44 on the outer ends of the arms 41. A central arm 45 is fitted, at its inner end, with an elongated bearing sleeve 46 fixed on the cross shaft 43 between the bearing sleeves 44; the central arm 45 extending forwardly at a downward incline. At its forward or free end the central arm 45 includes a tranverse bearing sleeve 47 having a pivot pin 48 journaled therein, but maintained against axial displacement.

At the end adjacent the vertical spindle 24 the pivot pin 48 is provided with a right-angle bracket 49, one leg of which is secured between the block 36 and the upper end of the spindle 24. In this manner the outer end of the articulated guiding arm assembly 39 is connected to the spindle 24 whereby to maintain said spindle, the attachment head, and a supported saw, for guided straight line movement without restricting free swinging of said saw along such line, and which swinging is possible by reason of the articulation or hinging action of the arm assemblies 17 and 39.

The guiding arm assembly 39 is so proportioned that the arms 41 and 45 always converge upwardly, and never lower or unfold to a full dead-center relationship.

A relatively light weight helical tension spring 50 is connected between the outer end of pivot pin 48, and one of the arms 41 intermediate the ends of the latter; said spring tending to maintain the entire device in balance for ease of to and fro movement, manually, of the electric hand saw, as supported from the attachment head unit 25.

A rod 51 extends between the central arm 45 and one of the arms 41 through heads 52 mounted on said arms. At opposite ends the rod 51 carries stop nuts 53, and a compression spring 54 surrounds the rod between the outer end one of said nuts 53 and the adjacent heads 52; this arrangement forming a cushioned bumper or stop arrangement to limit outward unfolding motion of the device.

Under certain working conditions it is desired to lock the rod 51 in the heads 52, and this is accomplished by locking screws 55.

For cross cutting operations the work is disposed on the table 3, and the angle of cut adjusted as follows:

For right-angle cuts the column unit 5 is rotatably adjusted about the spindle 4 so that the supported electric hand saw traverses a corresponding path relative to the work on table 3; this setting being accomplished through the medium of a spring-pressed latch unit 56 including a plunger 57 seating in a bore 58 in the base plate 1. See Fig. 3. There are a number of such bores in the base plate concentric to the axis of spindle 4 and disposed so that the column unit 5 may be adjusted for movement of the supported electric hand saw not only at right angles to the work, but also for 45° and 90° miter cuts.

For other non-right angle miter cuts, such as are used in roof framing, the column unit 5 may be accurately adjusted so that the saw will traverse the desired cutting path, in the following manner:

By loosening the locking screw 10, and releasing the latch 56, the column unit 5, including the post 8, may be turned about the spindle 4 to any selective position of rotative adjustment, and the angle is predetermined by reading the hair lines of transparent dial 14 on the angle scale disc 16. When the correct angle of adjustment is obtained, the locking screw 10 is tightened, which fixes the column unit 5 against rotation, and thus maintains the articulated guiding arm assembly 39 in position so that the supported hand saw will tranverse the aforesaid predetermined path.

When the device has been set to any given working angle, the operator merely grasps the handle, which is normally on the supported electric hand saw, and advances such saw to cut through the work; the articulated arm assemblies 17 and 39 supporting and guiding the saw, respectively, in the desired path.

During all cross cutting operations the work remains stationary on the work table 3, and the saw traverses the work, but for ripping operations the articulated arm assemblies 17 and 39 are locked up against articulating motion by setting up the locking screws 55 in the heads 52. The spindle 24 is then held rigid against horizontal motion, and the attachment head unit 25 is adjusted to a position such that the saw is set to rip work advanced manually over the table 3 in a direction from side to side of the same. Straight, as well as bevel, ripping can be accomplished, dependent upon the adjusted position of the saw suspended from the attachment head unit 25.

With the described saw support, a conventional portable electric hand saw can be mechanically supported and guided for movement, in the manner of a radial saw, to accomplish cuts rapidly, uniformly, and accurately.

The saw support is relatively simple in its construction, works easily, is of light-weight so that it can be easily transported from job to job, and when the arm assemblies are folded, occupies a relatively small space.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired.

1. A tool support comprising a base, a column unit upstanding from the base, an articulated supporting arm assembly mounted adjacent the column unit and projecting for articulation in a horizontal plane, an articulated guiding arm assembly mounted on the column and projecting in generally the same direction as the supporting arm assembly and spaced vertically of the latter, a tool attachment unit, such unit including a base and a vertically disposed spindle upstanding from the base, the outer end of the supporting arm assembly being turnably mounted about said spindle, a horizontal pivot pin, the outer end of the guide assembly being turnably mounted about said pivot pin, clamping means interposed between the pivot pin and the spindle and effective to maintain the pivot pin rigid with respect to the spindle, and means to adjust the spindle vertically with respect to the supporting arm assembly.

2. A tool support as in claim 1 in which said last named means comprises a screw turnably mounted on the spindle, and a nut on the outer end of the supporting arm assembly, the screw being threaded through the nut.

3. A tool support as in claim 1 in which the clamping means between the pivot and the spindle includes an angle bracket having its sides connected with the adjacent ends of the pivot pin and spindle, respectively.

MEARL V. TRACY.

REFERENCES CITED

The following references are of record in the file of this patent:

UNITED STATES PATENTS

| Number | Name | Date |
| --- | --- | --- |
| 1,083,160 | Villinger | Dec. 30, 1913 |
| 1,449,317 | Fager | Mar. 20, 1923 |
| 1,707,764 | Mattison | Apr. 2, 1929 |
| 1,733,518 | Snover | Oct. 29, 1929 |
| 1,832,101 | Decker | Nov. 17, 1931 |
| 1,846,295 | Wilderson | Feb. 23, 1932 |
| 1,846,641 | Hedgpeth | Feb. 23, 1932 |
| 2,007,563 | De Koning | July 9, 1935 |
| 2,326,416 | Tracy | Aug. 10, 1943 |
| 2,389,296 | Crane | Nov. 20, 1945 |

FOREIGN PATENTS

| Number | Country | Date |
| --- | --- | --- |
| 219,584 | Great Britain | July 31, 1924 |